(12) United States Patent
Shinagawa et al.

(10) Patent No.: US 6,574,697 B2
(45) Date of Patent: Jun. 3, 2003

(54) DATA TRANSFER EQUIPMENT THAT PROVIDES HIGH SPEED DATA TRANSMISSION BETWEEN DATA TERMINAL EQUIPMENT AND DATA CIRCUIT TERMINATING EQUIPMENT

(75) Inventors: Noriaki Shinagawa, Kanagawa (JP); Mineo Fujii, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/996,787

(22) Filed: Nov. 30, 2001

(65) Prior Publication Data

US 2002/0152345 A1 Oct. 17, 2002

(30) Foreign Application Priority Data

Apr. 17, 2001 (JP) ........................................ 2001-117572

(51) Int. Cl.[7] ........................... G06F 13/00; G06F 13/38
(52) U.S. Cl. ........................... 710/305; 710/52; 710/71; 710/313; 375/222
(58) Field of Search ........................... 710/305, 52, 62, 710/100, 310, 71, 313, 72, 307; 709/250, 253; 370/222, 257, 913; 711/1; 326/38; 379/142.01, 93.01, 93.05; 375/222

(56) References Cited

U.S. PATENT DOCUMENTS

| 4,377,843 | A | * | 3/1983 | Garringer et al. |
| 5,115,374 | A | * | 5/1992 | Hongoh |
| 5,309,504 | A | * | 5/1994 | Morganstein |
| 5,550,566 | A | * | 8/1996 | Hodgson et al. |
| 5,907,719 | A | * | 5/1999 | Nimishakavi |
| 6,167,120 | A | * | 12/2000 | Kikinis |

* cited by examiner

Primary Examiner—Gopal C. Ray
(74) Attorney, Agent, or Firm—Volentine Francos, PLLC

(57) ABSTRACT

Data transfer equipment enables high-speed transfer between a DTE (Data Terminal Equipment) and a DCE (Data Circuit Terminating Equipment). The data transfer equipment serves the DCE, and is connected through a first parallel bus to the DTE, and has a data processing section used to process data to be exchanged with the DTE. The data transfer equipment is provided with a transfer processing section connected to the data processing section through a second parallel bus, which is adapted to transfer, based on a specified control procedure, data received through the first parallel bus from the DTE to the data processing section through the second parallel bus and to transfer, based on the control procedures, data received through the second parallel bus from the data processing section to the DTE.

18 Claims, 3 Drawing Sheets

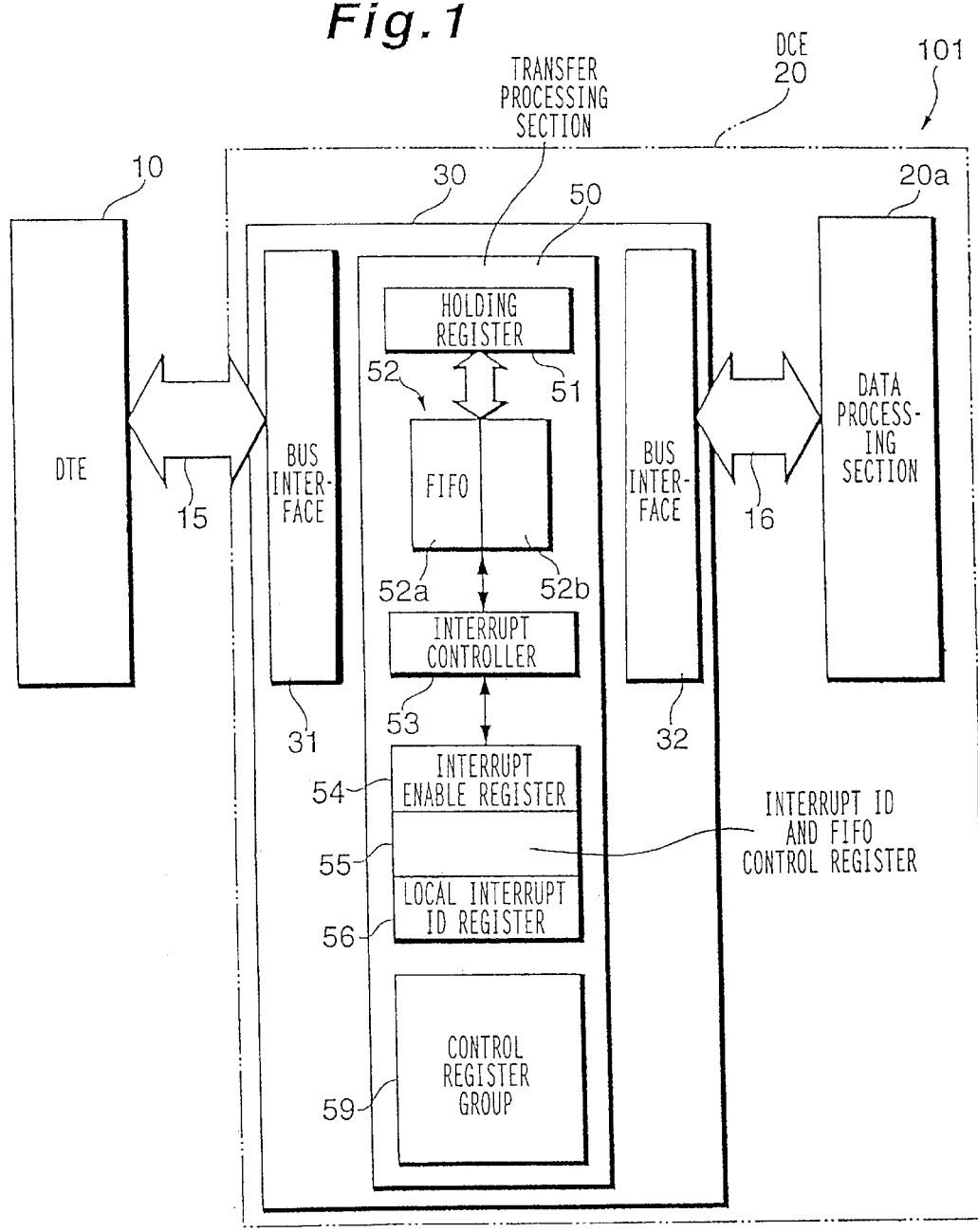

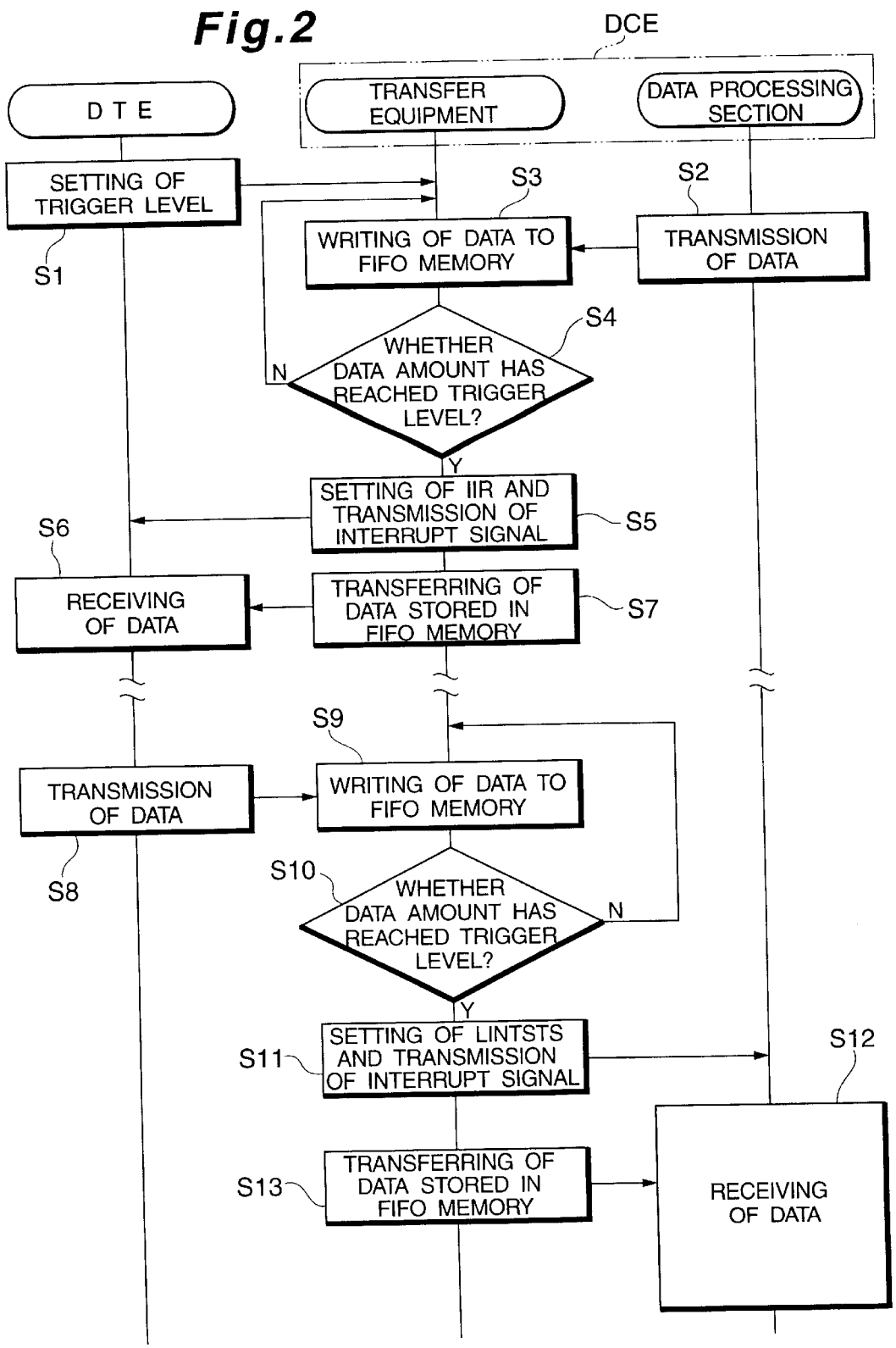

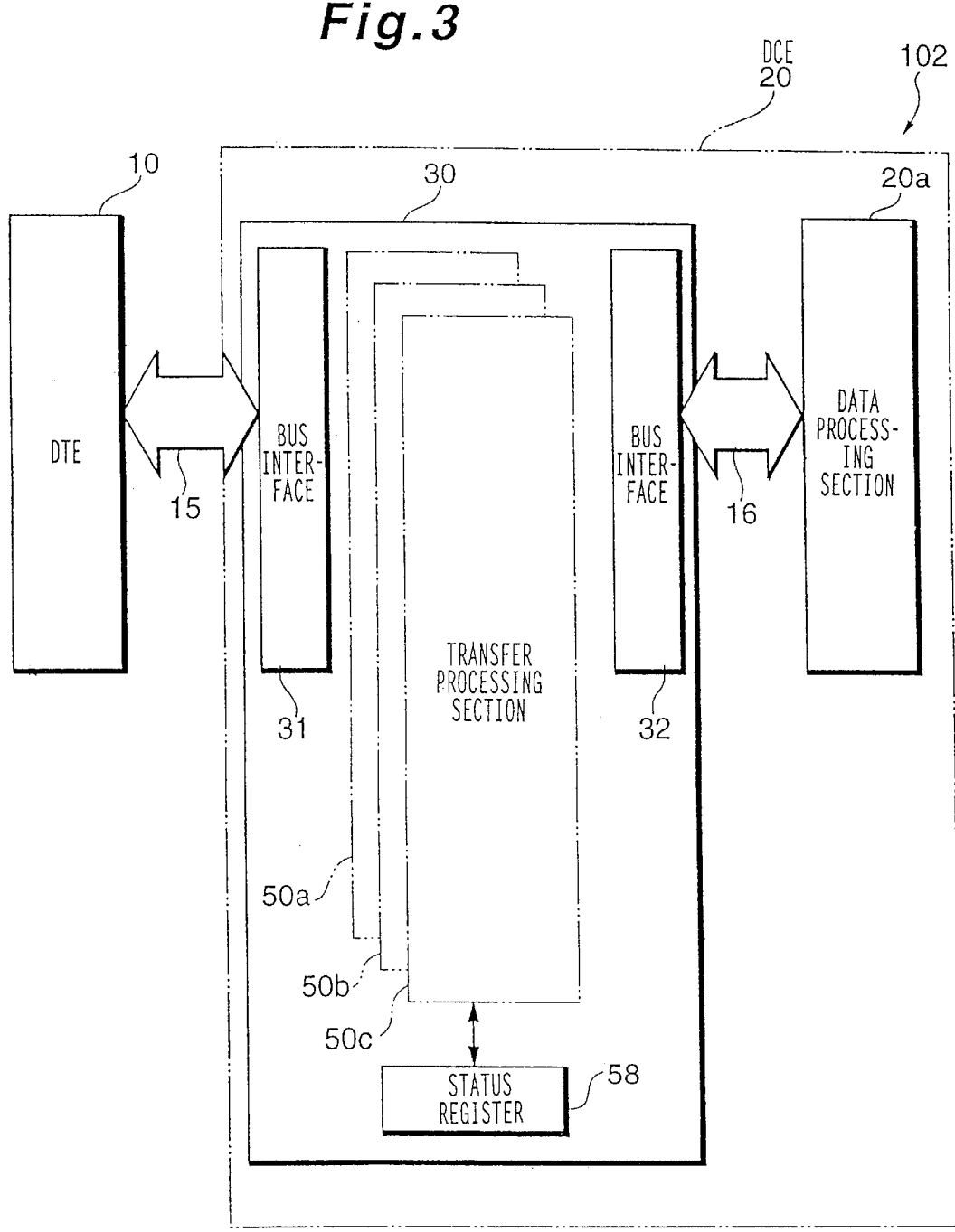

DATA TRANSFER EQUIPMENT THAT PROVIDES HIGH SPEED DATA TRANSMISSION BETWEEN DATA TERMINAL EQUIPMENT AND DATA CIRCUIT TERMINATING EQUIPMENT

BACKGROUND OF THE INVENTION

1. Field of the Invention

The present invention relates to data transfer equipment to transfer data between data terminal equipment (hereinafter referred to as a "DTE") such as a personal computer and data circuit terminating equipment (hereinafter referred to as a "DCE") being connected to the DTE such as a communication MODEM (Modulator-demodulator).

2. Description of the Related Art

Conventionally, for example, when data communications are carried out between a personal computer and a peripheral unit such as the communication MODEM, the personal computer is used as the DTE and the communication MODEM is used as the DCE. Inside the DTE and the DCE, a parallel bus to speed up data processing is provided and, for example, a PCI (Peripheral Component Interconnect) bus extending from the microprocessor is installed in the DTE. When the DTE is connected to the DCE at specified intervals, because data synchronous processing required for parallel bus connection is not necessary which can provide an advantage to data transmission carried out over a comparatively long distance, generally, serial bus connection is employed. Thus, the DTE and the DCE are connected using a specified serial bus cable. To the PCI placed in the DTE is connected to data transfer equipment having an UART (Universal Asynchronous Receiver/Transmitter) which can perform a function of a parallel to serial transfer. The UART can be applied to many receiving and transmitting circuits to carry out start-stop synchronous type communications being so-called asynchronous type communications and the UART is integrated on one chip as a controller which performs start-up synchronous system type serial data transmission for general purposes. The UART is provided with functions of serial data communication including detection and removal of start-stop bits, selection and control of the number of data bits or stop bits, generation and detection of a break sequence, detection of overrun or framing errors or a like. RS-232C standards designated by EIA (Electronic Industries Association) which are widely known as interface standards for control measuring instruments, communication devices or a like can be applied to the above UART. Therefore, many pieces of software corresponding to controlling procedures for the UART in accordance with the RS-232C are installed on many pieces of DTE. The above DCE is connected to a serial bus such as the RS-232C based serial bus extending from the data transfer equipment placed in the DTE. The DCE is provided with a data transfer equipment, same as the data transfer equipment mentioned above, that can perform a serial/parallel converting function corresponding to the serial bus, which enables the DCE to convert data received through the serial bus to data corresponding to its parallel bus. When the data communications are carried out between the DTE and the DCE, the data transfer equipment in the DTE converts data fed through the PCI bus of the DTE into serial data by the start-stop synchronous method and transfers the serial data through the serial bus to the data transfer equipment in the DCE. Besides, the data transfer equipment in the DTE converts the serial data fed, by the start-stop synchronous method, through the serial bus from the data transfer equipment in the DCE into data that can be matched to a size of the PCI bus on the side of the DTE and transfers the parallel data to the DTE.

As the DCE to be connected to the DTE, a so-called PHS (Personal Handyphone System) card serving as a card-type wireless communications device is used in some cases. Such the card-type DCE is inserted, for use, in a specified slot directly connected to the PCI bus in the DTE. Generally, the PHS card is provided with one data transfer equipment connected to the PCI bus on the DTE side and with the other data transfer equipment connected through the serial bus to the one data transfer equipment. The data fed from the serial bus, after having undergone the serial/parallel converting processing by the other data transfer equipment, is transmitted through the parallel bus extending from the other data transfer equipment to a wireless communications section.

However, when the RS-232C standards, for example, are applied to the serial bus provided in the card-type wireless communications equipment as described above, a maximum speed of a baud rate generator implemented on a UART chip of the data transfer equipment is about 115 kbps. Such a low speed serial transfer capability causes a bottleneck that imposes a limitation on the transfer speed between the DTE and the DOE.

SUMMARY OF THE INVENTION

In view of the above, it is an object of the present invention to provide data transfer equipment capable of implementing high-speed data transmission comparatively easily in data transfer between the DTE and DCE.

According to a first aspect of the present invention, there is provided data transfer equipment for serving the DCE which is connected through a first parallel bus provided in the DTE and has a data processing section used to process data to be exchanged with the DTE, including:

a transfer processing section connected through a second parallel bus to the data processing section to transfer, based on specified control procedures except procedures for a parallel/serial data converting function out of control procedures for a UART, data received through the first parallel bus from the DTE to the data processing section through the second parallel bus and to transfer, based on the specified control procedures, data received through the second parallel bus from the data processing section to the DTE.

In the foregoing, a preferable mode is one wherein the transfer processing section is provided with a first storing section used to store, on a temporary basis, data received through the first parallel bus from the DTE, a second storing section used to store, on a temporary basis, data received through the second parallel data from the data processing section and a first register used to store, on a temporary basis, data stored in the first storing section and the second storing section which is used when the DTE and the DCE write or read data to or from each of the first and second storing sections.

Also, a preferable mode is one wherein the transfer processing section is further provided with a control section used to feed control signals to permit each of the DTE and DCE to read data from each of the first and second storing sections and to permit each of the DTE and DCE to write data to each of the first and second storing sections, a second register used to hold each of the control signals to be fed to the DTE and a third register used to hold each of the control signals to be fed to the data processing section.

Also, a preferable mode is one that wherein includes:

a plurality of transfer processing sections including the transfer processing section; and an identifying section used to identify each of the transfer processing sections.

Also, a preferable mode is one wherein the DCE is a card-type communication MODEM device which is inserted for use into a predetermined slot of the DTE.

Also, a preferable mode is one wherein the data processing section in the DCE has a wireless communicating function.

Also, a preferable mode is one wherein the first parallel bus is a PCI bus.

Also, a preferable mode is one wherein the writing and reading of data to and from each of the first and second storing sections are performed in a FIFO (First In First Out) method.

With the above configuration, the high-speed data transfer between the DTE and the DCE can be implemented comparatively easily without the need for a high-speed clock that has been required in the conventional transfer equipment.

BRIEF DESCRIPTION OF THE DRAWINGS

The above and other objects, advantages and features of the present invention will be more apparent from the following description taken in conjunction with the accompanying drawings in which:

FIG. 1 is a schematic block diagram describing configurations of a data transfer system including data transfer equipment according to an embodiment of the present invention;

FIG. 2 is a sequence diagram showing procedures of operations of the data transfer system shown in FIG. 1; and FIG. 3 is a schematic block diagram describing configurations of the data transfer system including a modified example of the data transfer equipment according to an embodiment of the present invention.

DESCRIPTION OF THE PREFERRED EMBODIMENTS

Best modes of carrying out the present invention will be described in further detail using various embodiments with reference to the accompanying drawings.

EMBODIMENT

FIG. 1 is a schematic block diagram describing configurations of a data transfer system 101 including data transfer equipment according to an embodiment of the present invention. In the example in FIG. 1, the DTE 10 is a data terminal device 10 such as a personal computer and the DCE 20 is a card-type wireless communications device 20 such as the well-known PHS card. In FIG. 1, a state in which the DCE 20 is inserted in a specified slot (not shown) mounted in the DTE 10 is shown and the DCE 20 is connected to the DTE 10 through a PCI bus. The DCE 20 is provided with a data processing section 20a being a microcomputer used to perform wireless communication functions and with transfer equipment 30 used to transfer data between the data processing section 20a and the DTE 10. The transfer equipment 30 is connected to the DTE 10 through the PCI bus 15 and to the data processing section 20a installed on the local side of the DCE 20 through a local bus 16 being a parallel bus. The transfer equipment 30 is provided with a PCI bus interface 31 used to implement interfacing between the transfer equipment 30 and the PCI bus 15, a virtual UART section, that is, a transfer processing section 50 used to transfer data between the data processing section 20a and the DTE 10 and a local bus interface 32 used to implement interfacing between the transfer equipment 30 and the local bus 16.

Terminals of the PCI bus 15 are configured in accordance with protocol standards of the PCI, using, for example, a clock terminal, address/data terminal, byte enable terminal and/or control terminal. Terminals of the local bus 16, depending on configurations of the DCE 20, are constructed of control terminals including a local address terminal, local data terminal, local byte enable terminal, interrupt/read-write signal terminal or a like.

The transfer processing section 50 in the transfer equipment 30 includes an RSDATA (Receiver Buffer Register Transmitter Holding Register) 51, a FIFO (First In First Out) memory 52, an interrupt controller 53, an IER (Interrupt Enable Register) 54, an IIR/FFCTL (Interrupt Identification Register/FIFO Control Register) 55, an LINTSTS (Local Interrupt Identification Register) 56 and a control register group 59. The virtual UART section, that is, the transfer processing section 50 is made up of components obtained by removing components adapted to perform serial transferring functions from the conventionally well-known UART adapted to perform parallel/serial converting operations of data. The transfer processing section 50 transfers data between the data processing section 20a and the DTE 10.

The RSDATA 51 provided in the transfer processing section 50 is a register used to receive and transmit data to be transferred through the transfer processing section 50 and each of the DTE 10 and DCE 20 reads data from the RSDATA 51 and writes data to the RSDATA 51. The FIFO memory 52 is a memory controlled by a FIFO method and serves as a buffer memory used to store, on a temporary basis, data transferred through the RSDATA 51. The FIFO memory 52 has a first storing section 52a used to store data fed from the DTE 10 and written to the RSDATA 51, that is, the downward data on a temporary basis and a second storing section 52b used to store data fed from the data processing section 20a through the local bus 16 and written to the RSDATA 51, that is, the upward data on a temporary basis. The FIFO memory 52 accommodates differences in transfer speed between upward data transfer and downward data transfer and enables a well-known burst transfer that can correspond to high-speed data transfer. Data size used in the FIFO memory 52 can be set to, for example, 64 bits, 32 bits, 16 bits or 8 bits, depending on a data width of the PCI bus 15. A depth of the FIFO memory 52 is determined depending on the transfer speed and is set, for example, at 16 bytes.

The IER 54 is a register used to control so as to make valid or invalid the occurrence of an interrupt at a time of writing and reading data to and from the FIFO memory 52. The IIR/FFCTL 55 is a register used to provide identification information showing a cause of the interrupt to the side of the DTE 10. The LINTSTS 56 is a register used to provide the same identification information as above to the side of the DCE 20. Addresses of the register group placed in the transfer processing section 50 are assigned in address space of an I/O address that can be controlled from the CPU in the microprocessor section (not shown) on the side of the DTE 10 and addresses based on the UART specification are assigned to each of the registers. For example, "0h" is assigned to the RSDATA 51, "1h" is assigned to the IER 54 and "2h" is assigned to the IIR/FFCTL 55. The CPU on the DTE side, by accessing each of the registers based on the above addresses, can control the transfer equipment 30 by so-called I/O access.

The interrupt controller 53 sends out interrupt signals to the data processing section 20a on the side of the DCE 20 and to the DTE 10 at the time of writing and reading data to and from the FIFO memory 52. The information about the cause of the interruption is set to the IIR/FFCTL 55 serving as the control register and used to inform the DTE of the information and to the LINTSTS 55 also serving as the control register and used to inform the DCE 20 of the information. The DTE 10 and the DCE 20 can identify the cause of the interrupt by referring to the IIR/FFCTR 55 and the LINTSTS 56 respectively. The causes of the interrupt include a case in which a forced break interrupt is required due to the occurrence of overrun errors, a case in which the amount of received data reaches a trigger level and a notification that the received data can be used is made, a case in which writing of data to the FIFO memory 52 is stopped because the amount of the received data has not yet reached the trigger level within a predetermined period of time, a case in which the RSDATA 51 serving as the receiving and transmitting register is empty and a case in which a connection state is informed at a time of controlling the MODEM.

Operations of the FIFO 52 become valid by setting a register bit 0 to a predetermined value in the IIR/FFCTL 55 which allows the interrupt for writing and reading data to and from the FIFO 52. The interrupt for receiving data occurs when the number of pieces of data to be stored in the FIFO memory 52 exceeds a predetermined trigger level at the time of receiving the data. That is, the number of the received data exceeds the trigger level, the processing of reading the data is enabled. The trigger level can be set to register bits 7 and bits 6 in the IIR/FFCTL 55 and the above interruption is cleared when the reading is performed till the number of the data in the FIFO memory 52 becomes below the trigger level. Moreover, the interrupt for the transmission occurs when the FIFO memory 52 is empty of data when the data is to be transmitted, that is, when there is no data to be read from the FIFO memory 52. The interrupt for the transmission is cleared when the IIR/FFCTL 55 or the LINTSTS 56 is referred to or when new data is written to the FIFO memory 52. The designated number of bytes of data can be stored based on a depth of the FIFO memory 52. When data communications are carried out between the DTE 10 and the DCE 20, if no limitation is imposed to the data transfer speed, the FIFO memory 52 is not required and therefore the data transfer may be implemented by the receipt and transmission of the data carried out only by the RSDATA 51.

The control register group 59 is a register used to control the DCE 20 so that it is operated as the communication device in accordance with the RS232C standards and has a line control register, line status register, MODEM status register and scratch register.

FIG. 2 is a sequence diagram showing procedures for operations of the data transfer system 101 including the transfer equipment 30. Prior to the data communication between the DTE 10 and the DCE 20, the DTE 10 initializes each of the registers placed on the DTE and performs the setting of the trigger level to the IIR/FFTCL 55 (Step S1).

Operations and procedures of transmitting data from the DCE 20 to the DTE10 will be described below.

The data processing section 20a in the DCE 20 sets all the local byte enable terminals in the local bus 16 at "0" and transmits data, in a manner to meet 32 bits data bus width, to the RSDATA 52 (Step S2). The transfer equipment 30 writes the above data fed from the data processing section 20a to the second storing section 52 in the FIFO memory 52 through the RSDATA 51 (Step S3). Next, the transfer equipment 30 judges whether the amount of data stored in the FIFO 52 reaches the trigger level (Step S4) and, if it has not yet reached the trigger level, continues writing the data.

When the amount of the data stored in the FIFO 52 has reached the trigger level, the transfer equipment 30 informs, for setting, the IIR/FFCTL 55 that the data amount has reached the trigger level and sends out an interrupt signal to the DTE 10 side (Step S5). The DTE 10, after having received the interrupt signal, sets all the byte enable terminals in the PCI bus at "0" and starts to receive, by I/O access, that is, by PIO (Program Input/Output) access, the above data read through the RSDATA 51 from the FIFO 52 (Step S6). Then, the transfer processing section 50 in the transfer equipment 30 reads data stored in the FIFO memory 52 sequentially to the RSDATA 51 and transfers the read data through the PCI bus to the DTE 10 (Step S7).

Next, operations of and procedures for transmitting data from the DTE 10 to the DCE 20 will be described below. The DTE 10, after having set all the byte enable terminals at "0", transmits data, in a manner to meet the 32 bit data width of the PCI bus 15, to the RSDATA 51 (Step S8). The transfer equipment 30 writes the data from the RSADATA 51 to the FIFO memory 52 (Step S9). Then, the transfer equipment 30 judges whether the mount of the data written to the FIFO 52 has reached the trigger level (Step S10) and, if it has not yet reached the trigger level, continues to write the data.

When the amount of the data written to the FIFO memory 52 has reached the trigger level, the transfer equipment 30 informs, for setting, the LINTSTS 56 that the amount of the data has reached the trigger level which becomes a cause of the interrupt and sends out an interrupt signal through the local bus 16 to the data processing section 20a (Step S11). The data processing section 20a, in response to the setting of the LINTSTS 50 and to the interrupt signal, sets all the local byte enable terminals in the local bus 16 at "0" and receives the data stored in the FIFO memory 52 through the RSDATA 51. At the same time, the data processing section 20a, by referring to a line status register (not shown) in the control register group 59 of the transfer processing section 50, recognizes the presence or absence of the data stored in the RSDATA 51 and FIFO memory 52 (Step S12) and the transfer equipment 30 reads the data stored in the FIFO memory 52 sequentially to the RSDATA 51 and sends out the read data sequentially to the data processing section 20a (Step S13).

In the transfer equipment 30 of the embodiment, since a bus width on the DCE 20 side, that is, the bus width of the local bus 16 is set to 32 bits, by making the FIFO memory 52 sufficiently large in size, access to each register of the transfer processing section 50 is obtained at the same transfer speed as provided by the PCI bus 15 on the DTE 10 side. This enables data transfer at a speed of about 33 MB/sec that is permitted by the PCI protocol between the DTE 10 and the DCE 20. Also, by setting the bus width of each of the PCI bus and the local bus 16 to 64 bits, access to each register of the transfer processing section 50 is obtained at the same transfer speed as that of the PCI bus 15 on the side of the DCE 20. This enables data transfer at a speed of about 66 MB/sec that is permitted by the PCI protocol, between the DTE 10 and the is DCE 20. Moreover, by using a bus master function for data transfer in the PCI bus and using a DMA (Direct Memory Access) for data transfer in the local bus 16, a maximum data transfer rate can be 133 MB/sec.

The data width of the local bus 16 in the DCE 20 may be different from that of the PCI bus 15 in the DTE 10. For example, the data width of the PCI bus may be 32 bits and the data width of the local bus 16 may be 8 bits. Therefore, when the date widths of both the buses are different from each other, by installing a temporary register to accommodate the difference in the bus widths, even if the speed of the data transmission in the communication system on the DCE 20 side is slower that that on the DTE 10 side, matching in the transfer speed between the communication systems on the DCE 20 and on the DTE 10 can be achieved. In such the case as above, a maximum data transfer rate can be about 28 MB/sec.

FIG. 3 is a schematic block diagram describing configurations of the data transfer system 102 including a modified example of the data transfer equipment 30 according to the embodiment of the present invention. The modified transfer system 30 in the data transfer system 102 is provided with at least two or more transfer processing sections (50). In the example in FIG. 3, transfer processing sections 50a to 50c are provided. The modified transfer equipment 30 further has a status register 58 called an FUNCSTS (Functional Interrupt Status Register) which serves as an identifying section to identify when the data processing section 20a in the DCE 20 receives such the interrupt signal as described above, which one of the transfer processing sections 50a to 50c has sent out the interrupt signal.

The DTE 10 recognizes each of the registers provided to each of the transfer processing sections 50a to 50c as a unit having an address being different for every transfer processing section, in the I/O address space, and controls each of the transfer processing sections 50a to 50c to transmit or receive data between the DTE 10 and the DCE 20. The data processing section 20a in the DCE 20, when receiving the interrupt signal, identifies, by referring to the FUNCSTS 58, which one of the transfer processing sections 50a to 50c is a transmitter of the signal. For example, when the interrupt signal is sent out from the transfer processing section 50a to the DCE 20, identification information that the transmitter of the interrupt signal is the transfer processing section 50a is input to the FUNCSTS 58. The DCE 20, after having recognized that the transmitter of the interrupt signal is the transfer processing section 50a by referring to the FUNCSTS 58, reads or writes data from or to the FIFO memory 52 and RSDATA 51 of the transfer processing section 50a.

In the modified transfer equipment 30 in the data transfer system 102, since a plurality of the transfer processing sections (50a to 50c) are provided in one transfer equipment 30, data transfer over a plurality of channels can be implemented by only one piece of the transfer equipment.

It is apparent that the present invention is not limited to the above embodiments but may be changed and modified without departing from the scope and spirit of the invention.

What is claimed is:

1. Data transfer equipment for serving a DCE (Data Circuit Terminating Equipment) which is connected through a first parallel bus provided in a DTE (Data Terminal Equipment) and has a data processing section used to process data to be exchanged with said DTE, the data transfer equipment comprising:

a transfer processing section connected through a second parallel bus to said data processing section to transfer, based on specified control procedures except procedures for a parallel/serial data converting function out of control procedures for a UART (Universal Asynchronous Receiver/Transmitter), data received through said first parallel bus from said DTE to said data processing section through said second parallel bus and to transfer, based on said specified control procedures, data received through said second parallel bus from said data processing section to said DTE, wherein said DCE is a card-type communication MODEM (Modulation and demodulation) device which is inserted for use into a predetermined slot of said DTE, and wherein said data processing section in said DCE has a wireless communicating function.

2. The data transfer equipment according to claim 1, wherein said transfer processing section is provided with a first storing section used to store, on a temporary basis, data received through said first parallel bus from said DTE, a second storing section used to store, on a temporary basis, data received through said second parallel data bus from said data processing section, and a first register used to store, on a temporary basis, data stored in said first storing section and said second storing section which is used when said DTE and said DCE write or read data to or from each of said first and second storing sections.

3. The data transfer equipment according to claim 2, wherein said transfer processing section is further provided with a control section used to feed control signals to permit each of said DTE and DCE to read data from each of said first and second storing sections and to permit each of said DTE and DCE to write data to each of said first and second storing sections, a second register used to hold each of said control signals to be fed to said DTE and a third register used to hold each of said control signals to be fed to said data processing section.

4. The data transfer equipment according to claim 3, further comprising:

a plurality of transfer processing sections including said transfer processing section; and an identifying section used to identify each of said transfer processing sections.

5. The data transfer equipment according to claim 2, wherein said writing and reading of data to and from each of said first and second storing sections are performed in a FIFO (First In First Out) method.

6. The data transfer equipment according to claim 1, wherein said first parallel bus is a PCI (Peripheral Component Interconnect) bus.

7. Data transfer equipment for serving a DCE (Data Circuit Terminating Equipment) which is connected through a first parallel bus provided in a DTE (Data Terminal Equipment) and has a data processing section used to process data to be exchanged with said DTE, comprising:

a transfer processing section connected through a second parallel bus to said data processing section to transfer, based on specified control procedures except procedures for a parallel/serial data converting function out of control procedures for a UART (Universal Asynchronous Receiver/Transmitter), data received through said first parallel bus from said DTE to said data processing section through said second parallel bus and to transfer, based on said specified control procedures, data received through said second parallel bus from said data processing section to said DTE, wherein said transfer processing section is provided with a first storing section used to store, on a temporary basis, data received through said first parallel bus from said DTE, a second storing section used to store, on a temporary basis, data received through said second parallel data bus from said data processing section, and a first register used to store, on a temporary basis, data stored in said first storing section and said second storing section which is used when said DTE and said DCE write or read data to or from each of said first and second storing sections.

8. The data transfer equipment according to claim 7, further comprising:

a plurality of transfer processing sections including said transfer processing section; and an identifying section used to identify each of said transfer processing sections.

9. The data transfer equipment according to claim 7, wherein said DCE is a card-type communication MODEM (Modulation and demodulation) device which is inserted for use into a predetermined slot of said DTE.

10. The data transfer equipment according to claim 9, wherein said data processing section in said DCE has a wireless communicating function.

11. The data transfer equipment according to claim 7, wherein said first parallel bus is a PCI (Peripheral Component Interconnect) bus.

12. The data transfer equipment according to claim 7, wherein said writing and reading of data to and from each of said first and second storing sections are performed in a FIFO (First In First Out) method.

13. Data transfer equipment for serving a DCE (Data Circuit Terminating Equipment) which is connected through a first parallel bus provided in a DTE (Data Terminal Equipment) and has a data processing section used to process data to be exchanged with said DTE, comprising:

a transfer processing section connected through a second parallel bus to said data processing section to transfer, based on specified control procedures except procedures for a parallel/serial data converting function out of control procedures for a UART (Universal Asynchronous Receiver/Transmitter), data received through said first parallel bus from said DTE to said data processing section through said second parallel bus and to transfer, based on said specified control procedures, data received through said second parallel bus from said data processing section to said DTE, wherein said transfer processing section is provided with a first storing section used to store, on a temporary basis, data received through said first parallel bus from said DTE, a second storing section used to store, on a temporary basis, data received through said second parallel data bus from said data processing section, a first register used to store, on a temporary basis, data stored in said first storing section and said second storing section which is used when said DTE and said DCE write or read data to or from each of said first and second storing sections, a control section used to feed control signals to permit each of said DTE and DCE to read data from each of said first and second storing sections and to permit each of said DTE and DCE to write data to each of said first and second storing sections, a second register used to hold each of said control signals to be fed to said DTE, and a third register used to hold each of said control signals to be fed to said data processing section.

14. The data transfer equipment according to claim 13, further comprising:

a plurality of transfer processing sections including said transfer processing section; and an identifying section used to identify each of said transfer processing sections.

15. The data transfer equipment according to claim 13, wherein said DCE is a card-type communication MODEM (Modulation and demodulation) device which is inserted for use into a predetermined slot of said DTE.

16. The data transfer equipment according to claim 15, wherein said data processing section in said DCE has a wireless communicating function.

17. The data transfer equipment according to claim 13, wherein said first parallel bus is a PCI (Peripheral Component Interconnect) bus.

18. The data transfer equipment according to claim 13, wherein said writing and reading of data to and from each of said first and second storing sections are performed in a FIFO (First In First Out) method.

* * * * *